United States Patent
Moulinier et al.

(10) Patent No.: US 10,520,624 B2
(45) Date of Patent: Dec. 31, 2019

(54) STEERING FOR COVERAGE IN SEISMIC SURVEYS

(71) Applicant: CGG SERVICES SAS, Massy (FR)

(72) Inventors: Timothee Moulinier, Paris (FR); Thomas Mensch, Paris (FR)

(73) Assignee: CGG SERVICES SAS, Massy (FR)

(*) Notice: Subject to any disclaimer, the term of this patent is extended or adjusted under 35 U.S.C. 154(b) by 186 days.

(21) Appl. No.: 15/458,329

(22) Filed: Mar. 14, 2017

(65) Prior Publication Data
US 2017/0269248 A1  Sep. 21, 2017

Related U.S. Application Data

(60) Provisional application No. 62/308,345, filed on Mar. 15, 2016.

(51) Int. Cl.
*G01V 1/38* (2006.01)

(52) U.S. Cl.
CPC ................. *G01V 1/3808* (2013.01)

(58) Field of Classification Search
CPC .................................................. G01V 1/3808
See application file for complete search history.

(56) References Cited

U.S. PATENT DOCUMENTS

| 7,400,552 B2 * | 7/2008 | Moldoveanu | G01V 1/38 367/16 |
| 2012/0300583 A1 | 11/2012 | Flynn et al. | |
| 2015/0183502 A1 * | 7/2015 | Chene | B63H 25/04 701/21 |
| 2015/0185350 A1 | 7/2015 | Chene | |
| 2016/0003959 A1 * | 1/2016 | Bowman | G01V 1/3808 367/15 |

FOREIGN PATENT DOCUMENTS

| EP | 2889646 A1 | 7/2015 |
| WO | 2015071491 A1 | 5/2015 |

OTHER PUBLICATIONS

Extended European Search Report received in corresponding Application No. 17305276.2-1559, dated Aug. 9, 2017.

* cited by examiner

*Primary Examiner* — Krystine E Breier
(74) *Attorney, Agent, or Firm* — Patent Portfolio Builders PLLC

(57) ABSTRACT

A method for steering a marine seismic acquisition system by determining a steering point associated with towed seismic equipment is described. Coverage boundaries for a current line in a seismic survey and for an already acquired adjacent line in the seismic survey are computed. Cross-line distances between the coverage boundary for the current line and the coverage boundary for the adjacent line are computed based on a set of specifications for the seismic survey. A steering point associated with towed seismic equipment is determined based on the computed cross-line distances. A least one steering command for a steering element in the marine seismic acquisition system is generated based on the determined steering point.

10 Claims, 17 Drawing Sheets

| Offset class | CMP number selected | Distance of the CMP to adjacent the outer streamer CMP | Distance authorised |
|---|---|---|---|
| Near | i1 | d1 | D_near |
| Nearmid | i2 | d2 | D_nearmid |
| Nearfar | i3 | d3 | D_nearfar |
| Far | i4 | d4 | D_far |

Compute the I corresponding the maximum of
(di - D_spec)

This CMP is the point to steer

FIG. 11

STEERING FOR COVERAGE IN SEISMIC SURVEYS

CROSS REFERENCE TO RELATED APPLICATION

The present application claims the benefit of priority under 35 U.S.C. § 119(e) to U.S. Provisional Application No. 62/308,345, titled "Steering for Coverage", filed on Mar. 15, 2016, the entire contents being incorporated by reference into the present application.

TECHNICAL FIELD

Embodiments of the subject matter disclosed herein generally relate to methods and systems for marine seismic data acquisition and, more particularly, to mechanisms and techniques for adjusting the steering of vessels, sources and/or receivers used to perform seismic surveys in a way that minimizes the number of acquisition lines needed to achieve full coverage of the area being surveyed, while also adhering to the quality criteria of the acquisition.

BACKGROUND

Marine seismic data acquisition and processing techniques are used to generate a profile (image) of a geophysical structure (subsurface) under the seafloor. This profile does not necessarily provide an accurate location for oil and gas reservoirs, but it may suggest, to those trained in the field, the presence or absence of oil and/or gas reservoirs. In other words, such an image of the subsurface is a necessary tool today for those drilling exploration wells for minimizing the potential of finding a dry well. Thus, providing a better image of the subsurface is an ongoing process.

Marine seismic surveying is designed to image the subsurface of the earth over a specific area. The principle of the acquisition of the seismic data is to sample the targeted area by traversing programmed adjacent and parallel sail lines over the targeted area with a vessel towing a seismic spread composed of one or more source arrays and one or more receivers. To obtain reliable and good quality seismic image, the data has to be acquired continuously over the area. The quality of the distribution of the source and receivers positions during the acquisition is monitored by the analysis of the surface-derived seismic coverage on the bin grid.

For example, as shown in FIG. 1, a marine seismic data acquisition system 100 includes a survey vessel 102 towing a plurality of streamers 104 (one shown) that may extend over kilometers behind the vessel. One or more source arrays 106 (or simply "sources") may also be towed by the survey vessel 102 or another survey vessel (not shown) for generating seismic waves 108. Conventionally, the source arrays 106 are placed in front of the streamers 104, considering a traveling direction of the survey vessel 102. The seismic waves 108 generated by the source arrays 106 propagate downward and penetrate the seafloor 110, eventually being reflected by a reflecting structure 112, 114, 116, 118 at an interface between different layers of the subsurface, back to the surface 119. The reflected seismic waves 120 propagate upward and are detected by detectors 122 provided on the streamers 104. This process is generally referred to as "shooting" a particular seafloor 110 area.

Each marine seismic acquisition is typically designed in advance of the survey vessel(s) actually traversing the area to be imaged. For example, the area to be imaged can be divided into a grid of bins that have a set size depending on the acquisition parameters, typically 12.5×6.25 meters (see FIG. 2). The coverage is computed by calculating the number of mid positions of the triggered seismic source and of the receivers within the streamers that are located within each bin. These so-called common mid-points (CMPs) are classified by source/receiver distances (offsets) and sorted in offset classes/categories (e.g., near offset, mid offset and far offset). The mid-points could be also classified by azimuth of the source receiver direction. A typical quality criterion for seismic coverage is the number of mid-points located within a bin (fold) for a given offset class. Such quality criteria will typically be part of the survey specifications established, e.g., by the customer of the survey in conjunction with the survey designer.

Assuming no streamer feathering in the acquisition, the survey time is mainly driven by the spread width and the size of the survey area; in this case, the seismic coverage is uniform and corresponds to nominal perfect fold. However in a marine environment, the movement of seismic sources and streamers is very dynamic, responding to vessel steering, and more unpredictably, the effects of ocean currents. Because of these variables, the efficiency of the acquisition is related to the ability of the system to position the seismic spread such that the mid-point positions calculated during the acquisition design fill each bin with the minimal required coverage while at the same time also minimizing the number of over-folded bins. This, in turn, will minimize the number of sail lines to be traversed by the seismic vessel.

Given these variables, during the acquisition any area where the bins are filled with less than the nominal fold is subject to an assessment as to whether an additional pass with the seismic spread is required or not. Typically, the size of the "holes" (i.e., area where the fold is less than nominal) and the amount of mid points into the bins compared to nominal fold (in percentage) are parameters which are used to decide whether an additional pass is needed. Such additional passes by the survey vessel(s) are typically referred to as "infill lines".

Therefore the actual sail lines of the vessel, of the source(s) and of the associated spread are an important factor for optimization of the efficiency of the acquisition, for building a coverage without holes and without over filling the bins.

Several tools and strategies are available for assisting the vessel, the source and the spread of receivers to follow the pre-determined tracks associated with the binning grid described above with respect to FIG. 2 when guiding the survey vessel(s) along their sail lines. These tools and strategies include, for example, source pre-plot smoothing, current prediction to match feather, line selection schedule and timing, weather and current monitoring, dynamic source steering system (e.g., winch based, deflector based systems), receiver/streamer steering system, steering controller, vessel steering optimization, active deflectors/wing steering, etc.

Thus, the vessel steering system is a central contributor for achieving any strategy to properly position a point of interest (e.g., center of sources or source receiver mid-point) within the spread along a pre-determined track. An example of an optimized steering system 300 on-board a seismic vessel which can be used to steer the vessel along the predetermined tracks is depicted in FIG. 3. Therein, at block 302, a first input used in the navigation system 300 is the pre-planning information described above, e.g., the definition and selection of the predetermined tracks. Additional inputs include information provided by an integrated navigation system, e.g., information regarding the current position of the equipment towed by the survey vessel(s) relative to a point of interest (block 304) and environmental information such as current and/or wind information collected by environmental sensors (block 306). These inputs are provided to one or more controllers 308, e.g., processors, which take this data and output control information for steering the vessel(s), sources, streamers and/or deflectors, etc. This output control information is then sent to the actuator(s) that are responsible for manipulating the different elements to perform the steering, e.g., an autopilot 310, on-board actuators 312 and/or at-sea actuators 314. As used herein, the term "at least one steering element" refers to one or more of the elements 308, 310, 312 and 314.

Historically, steering the vessel(s) along the sail line while performing seismic surveying has been done manually on board the ship using the information given by binning software using the pre-calculated plots described above. For the navigator (i.e., a human operator), the usual process is to watch the binning software screen, spot holes in the coverage by scanning the colors, possibly anticipatively, and to adjust the vessel course accordingly. In practice, the steering offset (DTO) is constantly adjusted (visually) by the human operator. A first drawback of this manual technique is that steering the vessel to juxtapose the coverage of a current acquisition line with the coverage of the already-acquired adjacent line(s) implies that navigators must constantly adjust their steering commands by taking the information from the binning software for all the binning offset classes into account. A second drawback is that the optimization is done visually by an operator to try to achieve two different objectives, i.e., to avoid creating holes in the coverage which require infill passes and to also avoid overfilling the bins to optimize the number of passes required to cover the full survey area, which objectives are typically in conflict with one another:

Thus performing the vessel steering manually is suboptimal and very difficult to achieve even for an experienced operator. Yet another drawback of manual steering correction is excessive steering caused by dual objectives mentioned above. Such excessive steering often results in a sail line which is too dynamic/excessively complex, which makes that sail line difficult to mimic when a future 4D seismic survey is to be performed based on a current seismic survey.

Another, more recent, technique for steering vessels during seismic surveys is to maintain a null steering offset with regards to the pre-plot line in the anticipation of repeating the same acquisition for 4D purposes and reservoir monitoring over time. A main drawback of this more recent technique is that while setting a null steering offset indeed facilitates the 4D survey which may be performed later, it also may result, for instance in the case of varying sea current conditions, in poor global coverage of the area being surveyed such that additional sail lines are required to achieve the targeted coverage.

Accordingly, it would be desirable to provide systems and methods that enable automated variable steering of the vessel (or other elements of the seismic surveying system) to improve an accuracy of the subsurface's image and to improve the efficiency of the acquisition in terms of reducing infill lines.

Some attempts have been considered to address this problem. For example, in U.S. Patent Publication US 2015/0183502 A1 to Chene, F. and Boudon, S., and U.S. Patent Publication 2015/0185350 A1 to Chene F., various steering techniques for seismic vessels are described. Additionally, in U.S. Patent Publication WO2015071491 to Tonchia, H. and Moulinier, T., entitled "Device and Method for Steering Seismic Vessel", the disclosure of which is incorporated here by reference describes generating steering commands for an autopilot of a vessel to achieve a desired track of a point of interest associated with the towed equipment (rather than the point of interest being located on the vessel itself) for situations where the autopilot on the vessel was designed to receive vessel track commands and not the towed equipment point of interest track commands.

What is further needed are methods and systems for identifying the point of interest associated with the towed equipment and its desired track based on, among other things, properly determined coverage boundaries in a dynamic manner which can be provided as part of the steering information during the seismic acquisition and which further reduces the need for infills.

Accordingly, it would further be desirable to provide systems and methods for automated (or at least partially automated) vessel (or other element) steering for seismic surveys which avoid the aforementioned problems.

SUMMARY

According to an embodiment, there is a method for steering a marine seismic acquisition system by determining a steering point associated with towed seismic equipment. Coverage boundaries for a current line in a seismic survey and for an already-acquired adjacent line in the seismic survey are computed. Cross-line distances between the coverage boundary for the current line and the coverage boundary for the adjacent line are computed based on a set of specifications for the seismic survey. A steering point associated with towed seismic equipment is determined based on the computed cross-line distances. A least one steering command for a steering element in the marine seismic acquisition system is generated based on the determined steering point.

According to another embodiment, there is a system for collecting seismic data. The system includes at least one vessel that tows seismic equipment capable of generating and/or receiving seismic waves, as well as a processor, associated with a navigation system. The processor is configured to compute coverage boundaries for a current line in a seismic survey and for an already-acquired adjacent line in the seismic survey; compute cross-line distances between the coverage boundary for the current line and the coverage boundary for the adjacent line based on a set of specifications for the seismic survey; determine a steering point associated with towed seismic equipment based on the computed cross-line distances; and generate at least one steering command for a steering element in the system based on the determined steering point.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 11 depicts calculation of a most constraining CMP cross-line distance for selecting a steering point according to an embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of a vessel that tows at least a source array and plural streamers. However, the embodiments to be discussed next are not limited to this configuration, but may be applied to a streamer vessel that tows a source array and applies source steering to remove the errors due to the vessel navigation, for instance on a 4-dimensional (4D) survey, or to a source vessel without source steering to perform, for example, undershoot on a 4D survey, or to a streamer vessel with no source steering, to a vessel in a multi-vessel WAZ configuration, to a vessel performing coil shooting, to standard 3D or other configurations. The embodiments could also be applied to configurations where actuators (e.g., steering devices) are located on sources and on streamers and used to laterally and vertically steer the seismic spread (e.g. fanning, variable depth streamers).

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, steering of a seismic vessel (or another steerable element of the seismic surveying system as described below) is performed taking into account both geographic information (i.e., x/y coordinates) and geophysical information (i.e., offset and/or azimuth) associated with a current acquisition line and the already acquired adjacent line in the survey. By using both geographic and geophysical information, a steering point or direction for the vessel can be selected in an automated manner which provides a good balance between the competing survey interests described above in the Background section, i.e., to avoid the creation of holes in the coverage which require infill passes and to also avoid overfilling the bins to optimize the number of passes required to cover the full survey area.

Figure 4:
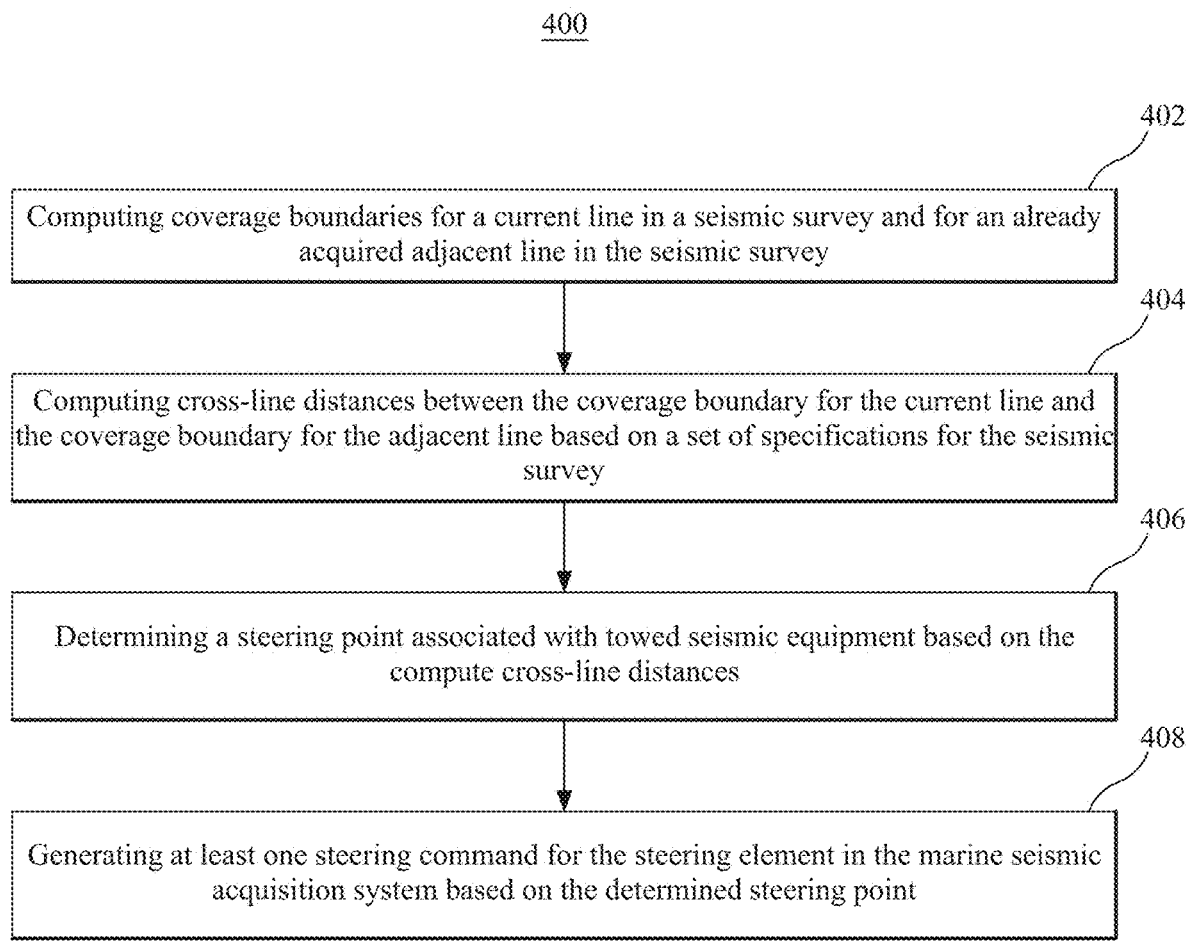
FIG. 4 is a flow chart illustrating a method according to an embodiment.

A general method embodiment 400 is illustrated in the flowchart of FIG. 4. Therein, a method for configuring a marine seismic acquisition system includes the step 402 of computing coverage boundaries for a current line in a seismic survey and for an already acquired adjacent line in the seismic survey. As mentioned above, according to an embodiment (which is described in more detail below) this step 402 takes into account both geographic and geophysical information. Next, at step 404, cross-line distances are computed between the coverage boundary for the current line and the coverage boundary for the adjacent line based on a set of specifications for the seismic survey. Then, at step 406, a steering point associated with towed seismic equipment is determined based on the computed cross-line distances. This steering point (also sometimes referred to herein as a "point to steer") is then used, at step 408 to generate a command for a steering element in the marine seismic acquisition system.

As used herein, the term "steering element" can refer to any element involved in the steering of one or more steerable devices found in marine seismic acquisition systems, i.e., elements usable to steer the vessel (e.g., rudder), elements usable to steer the sources, and/or elements usable to steer the receivers.

Figure 5:
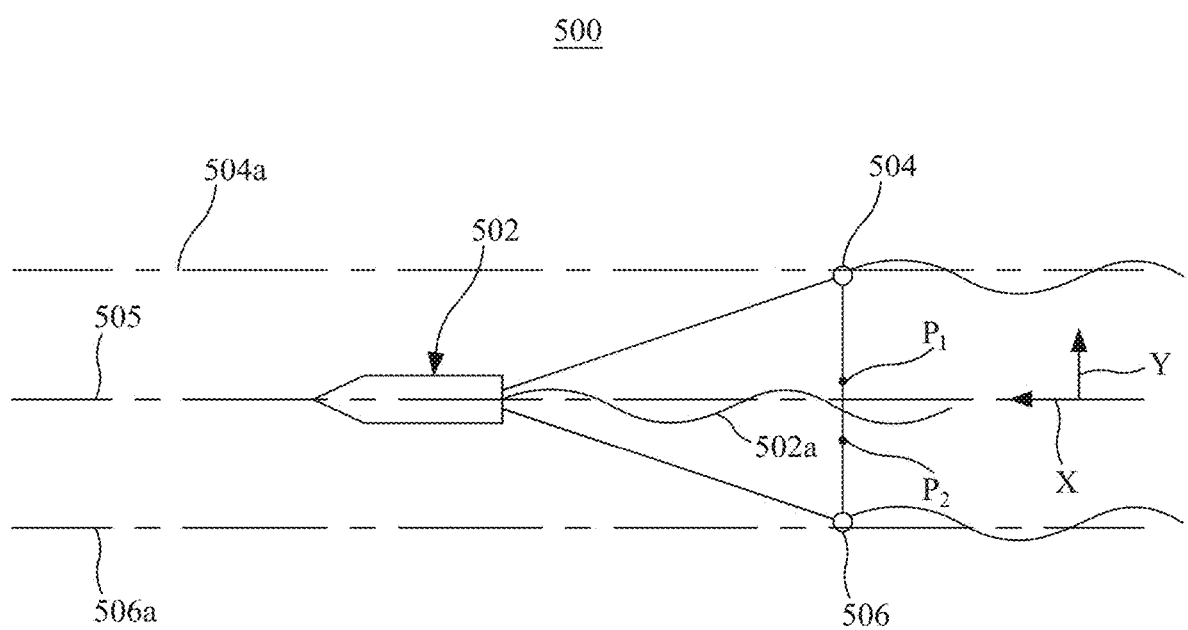
FIG. 5 illustrates a seismic survey system with two sources following a pre-determined track including two different steering points.

Prior to discussing in detail the embodiment of FIG. 4, and other embodiments, some general terminology and contextual material will be presented Consider the illustration of FIG. 5 to better understand the context of identifying a steering point for usage in these embodiments to generate steering commands. Therein, a marine seismic acquisition system 500 includes a vessel 502 and two source arrays 504 and 506 and is in the process of performing a seismic survey. FIG. 5 illustrates a past path 502a over the ground of vessel 502, and the expected or desired tracks (i.e., the pre-plot tracks which were determined before the survey was started) 504a and 506a for source arrays 504 and 506, respectively. In some applications, the pre-plots 504a and 506a of each source array are replaced or completed by a single pre-plot 505, which represents the mid-point between source arrays 504 and 506.

Regarding the sources, it is conventional to tow a source array that includes three sub-arrays. Each sub-array includes a float to which individual source elements are attached. Thus, all the individual source elements may be located at a same or different depth. It is also possible that each vessel tows two or more source arrays.

Under ideal conditions, as illustrated in FIG. 5, it is expected that source arrays 504 and 506 follow pre-plot tracks 504a and 506a within a couple of meters. Even with no wind, no current and no waves, just the inherent hydrodynamic forces and drag would make the vessel and the sources deviate from their tracks. Usually, initial estimates of the sources' positions are determined relative to the vessel's position by technology such as RGPS (relative GPS) giving a bearing and distance to a reference point on the vessel (usually a GPS antenna). This leads to the determination of a real time estimate of the paths over the ground of the sources.

However, due to real conditions, e.g., wind, waves, ocean currents, vessel speed which may control the separation between several sources, interaction between vessel and source arrays, etc., the source arrays 504 and 506 do not follow pre-plot tracks 504a and 506a even if the vessel follows the pre-plot track 505. According to embodiments described herein, the vessel 502 (or another steerable element associated with the marine seismic acquisition system) is steered so that the source arrays 504 and 506 more closely follow the pre-plot tracks 504a and 506a, and in a manner which is designed to reduce the need for infills, by dynamically selecting a point of interest P which is associated with the towed equipment based, at least in part, on the boundary coverage of a current line being traversed by the vessel 502 as well as the boundary coverage of a line adjacent to the current line.

In this regard, and according to an embodiment, the on-board navigation system (or another processing system) can dynamically and/or periodically determine the point of interest P, and use the determination of that point, as well as other steering information (e.g., the pre-plot tracks, survey specification criteria, etc.) to generate one or more steering commands to one or more steering elements within the marine acquisition system. For example, as shown in FIG. 5, at a first point in time during the survey, the system may determine that the steering point is $P_1$ and that, at a second point in time during the survey, the system may determine that the steering point is $P_2$, i.e., a point different than $P_1$. Note that although steering points $P_1$ and $P_2$ are illustrated as being points along a line between sources 504 and 506, they are not required to be so disposed and can be any points associated with the towed equipment, i.e., steering points which are chosen based on positioning of the towed equipment rather than the positioning of the vessel.

Figure 6A:
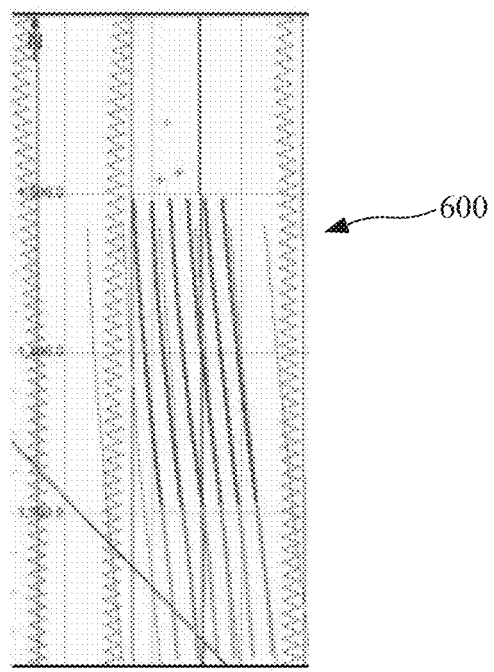
FIG. 6(a) shows real time positioning of a seismic spread.
Figure 6B:
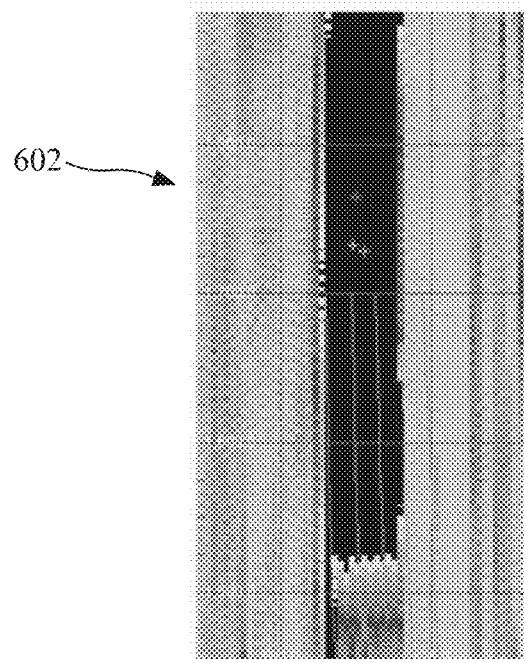
FIG. 6(b) shows real time coverage of a seismic survey.

The manner(s) in which such steering points are dynamically determined according to various embodiments will now be described in more detail. During a marine seismic survey the navigator (and the navigation system) has access to real time information: as the vessel and the towed equipment progress spatially and data is acquired, new shots data are available and the position of the source and receivers populates the area and the bins. An example of real time information available for steering decision is shown in FIGS. 6(a) and 6(b); specifically a real time snapshot of the position of the seismic spread 600 (sources and receivers) in FIG. 6(a)) and real time map of the coverage 602 which has been generated by the survey as it is being performed (FIG. 6(b)).

In addition to this type of dynamic, real time data associated with the seismic survey as it is being performed the navigation system also has certain static data to work with when determining its steering points. For example, and in addition to the data associated with the pre-plot tracks, the navigation system will also be pre-programmed with the specification data for the survey. For each marine seismic survey, there will exist certain quality control specifications which are used to evaluate the coverage being provided by the survey and to make infill decisions based on the evaluated coverage as compared to the predetermined quality control specifications. An example of a set of quality control specifications for coverage is provided in the table below.

| Range/Class | Near | Near-Mid | Mid-Far | Far | All |
|---|---|---|---|---|---|
| Required coverage | 84% | 77% | 80% | 67% | 80% |
| Infill decision | 2 bins | 1 bin | 2 bins | 3 bins | |

Referring to the table above, the quality control specifications are normally made for offset ranges along the cables. For instance, the streamer can be divided into four segments of equal length defining 4 distinct offset ranges/classes: near, near-mid, mid-far and far. The specifications above also specify a required minimum coverage that has to be achieved for each offset classes to accept/validate the acquisition line, in this exemplary case:

84% of full coverage for first quarter (class=near) of the streame,

77% of full coverage for second quarter (class=near mid) of the streamer,

80% of full coverage for third quarter (class=mid far) of the streamer,

67% of full coverage for fourth (class=far) quarter of the streamer.

In addition to that, the admissible spatial extent of the coverage holes for each offset class is provided in the specifications, e.g., as shown in the last row of the table. For coverage below and holes larger than these specifications, additional infill lines must be acquired to supplement the coverage.

The above-described data can be used to generate steering points, and steering commands based on those steering points, according to, for example, the above-described embodiment of FIG. 4. For example, at step 402, the coverage boundaries of the current line and already acquired adjacent line can be computed using the following equations and methods:

$$C = f(x, y, h, \Theta) = \sum_{S,R} \delta\left(\frac{\vec{X_s} + \vec{X_r}}{2} - \vec{\iota_0}\right) \quad (1)$$

where:
C is the number of hits,
x, y are geographical coordinates,
h is the offset (i.e., the distance between source and receiver of the hit),
$\Theta$ is the azimuth (i.e., heading between source and receiver of the hit),
S is the distribution of source locations,
R is the distribution of receivers,
lo is the location verifying xo, yo,ho and $\Theta$o,
and $\delta$ is the Dirac function.

Then the boundaries of coverage between fold $n_1$ and $n_2$, i.e., B ($n_1$, $n_2$) are defined by curve verifying:

$$B(n_1, n_2) = \sum_{S,R} \delta\left(\frac{\vec{X_s} + \vec{X_r}}{2} - \vec{\iota_0}\right) < n_1 \quad (2)$$

and $$\sum_{S,R} \delta\left(\frac{\vec{X_s} + \vec{X_r}}{2} - \vec{\iota_0}\right) > n_2$$

To illustrate the embodiment described above, equations (1) and (2) were applied to a synthetic data set in a simulation, which synthetic data set is similar to that which might be expected to be generated in real-time by the navigation system during a seismic acquisition to calculate the coverage of the current line and the adjacent line as a function of both offset and geographical coordinates. The graphical results of the si mulation in terms of coverage as a function of offset class are shown in FIGS. 7(a)-7(e).

Figure 7A:
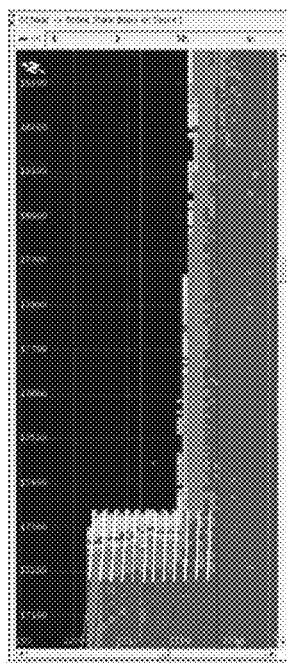
FIGS. 7(a)-7(e) illustrate computed coverage boundaries for different offsets.
Figure 7B:
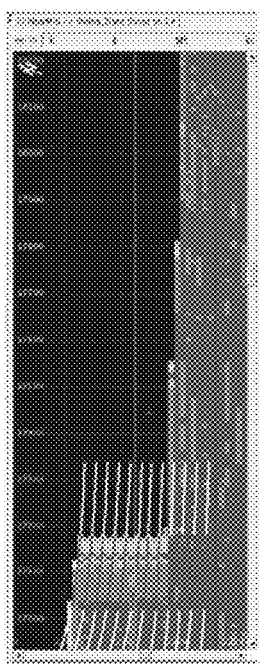
Figure 7C:
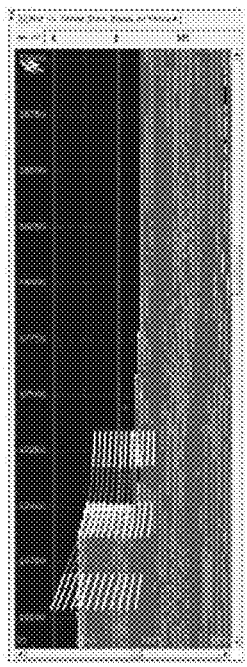
Figure 7D:
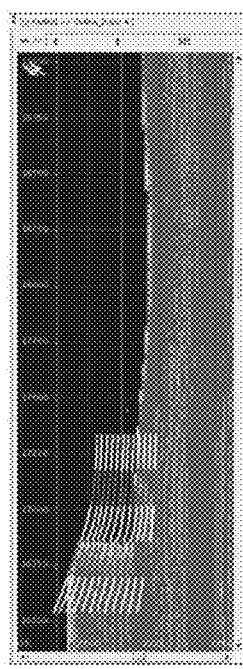
Figure 7E:
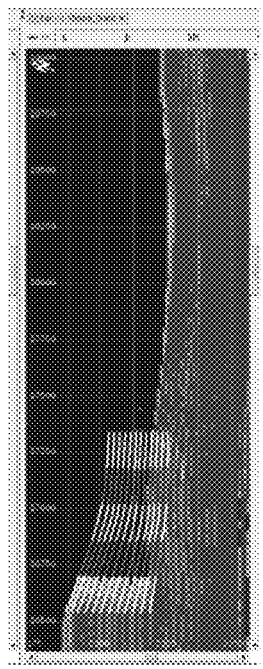

For instance, for each offset h, the coverage C can be displayed as a shaded (or colored) map examples of which are shown in FIGS. 7(a)-7(e). Therein, FIG. 7(a) shows the coverage where h is equal to near offset, FIG. 7(b) shows the coverage where h is equal to near mid offset, FIG. 7(c)

shows the coverage where h is equal to mid offset, FIG. 7(d) shows the coverage where h is equal to mid far offset and FIG. 7(e) shows the coverage where h is equal to far offset. The boundary can then be computed using a given minimal threshold for the fold. Typically the boundaries are obtained using the outer streamer and the sources.

Figure 8:
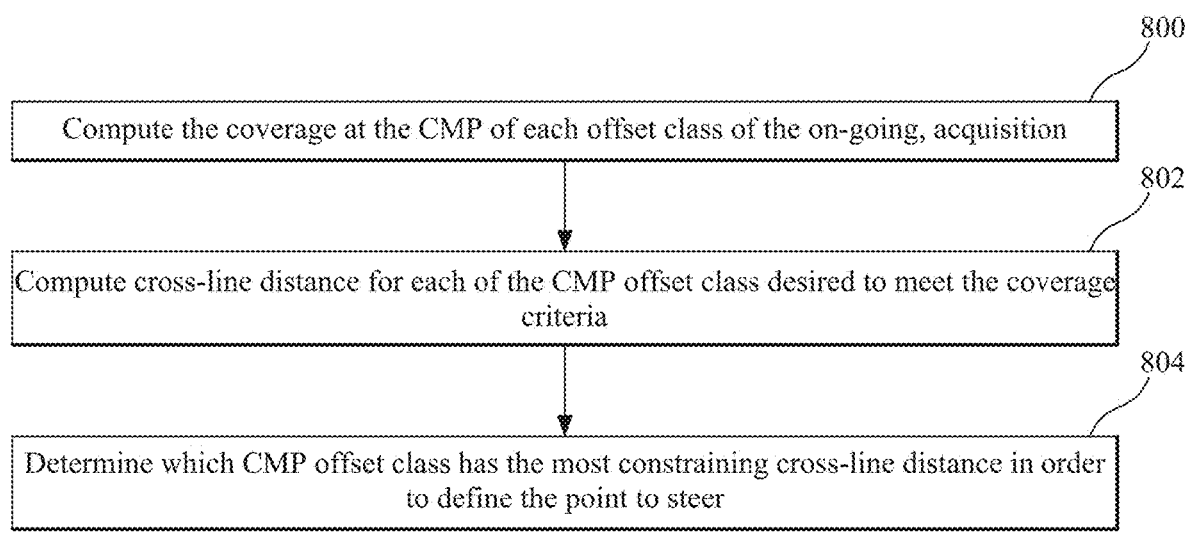
FIG. 8 is a flow chart of a method according to an embodiment.

Having calculated the boundaries of coverage, e.g., using equations (1) and (2), the next steps associated with the method embodiment 400 are to compute the cross line distances between the two coverage boundaries based on the survey specifications at step 404 and to determine a point of interest or steering point associated with towed seismic equipment based on the computed cross-line distances at step 406. These steps 404 and 406 can, according to one embodiment, be performed using the steps shown in the flow chart of FIG. 8 and, features of which are graphically illustrated in FIGS. 9 and 10. First, at step 800, the coverage at each CMP of each offset class for the survey being conducted (i.e., the coverage generated thus far in the survey using the real time data), can be computed.

Figure 9:
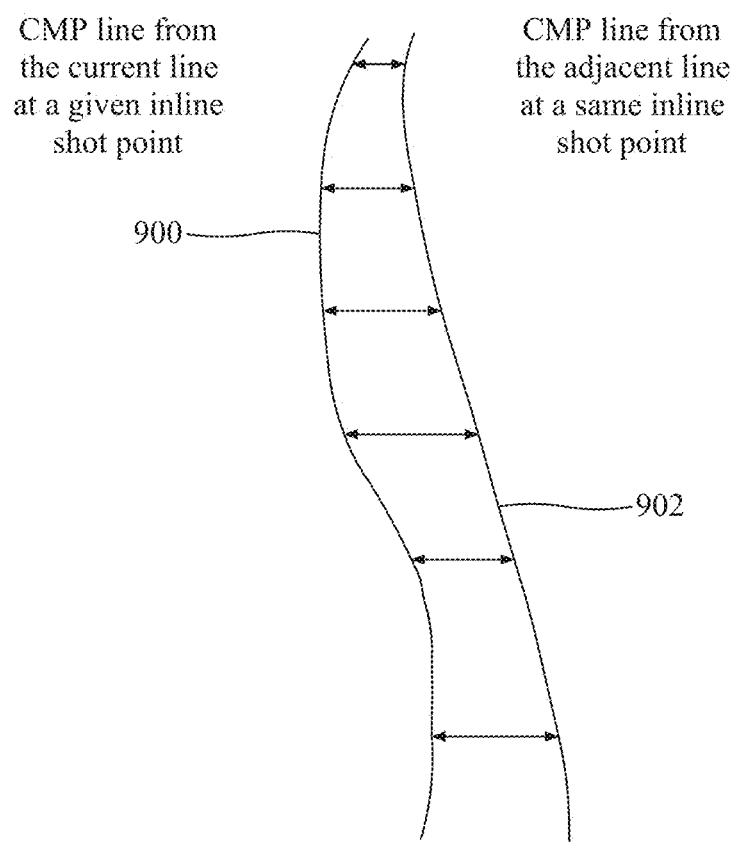
FIG. 9 graphically depicts computed distances between CMPs of a current acquisition line and the CMPs of an adjacent acquisition line at the same inline shot point.

Next, at step 802, the cross-line distance of for each of the CMP offset classes needed to meet the coverage criteria (i.e., as set forth in the survey specifications, an example of which was provided in the Table above) can also be computed. This step 802 involves calculating cross-line distances between a CMP line 900 for the current acquisition line and the CMP line 902 from the adjacent acquisition line as shown in FIG. 9 for the same inline shot points (which distances and shot points are graphically indicated by the horizontal arrows between CMP lines 900 and 902). These computed cross-line distances can then be binned by offset class to generate a distribution of the distances between the two CMP lines as a function of offset class, an example of which is shown in FIG. 10.

Figure 10:
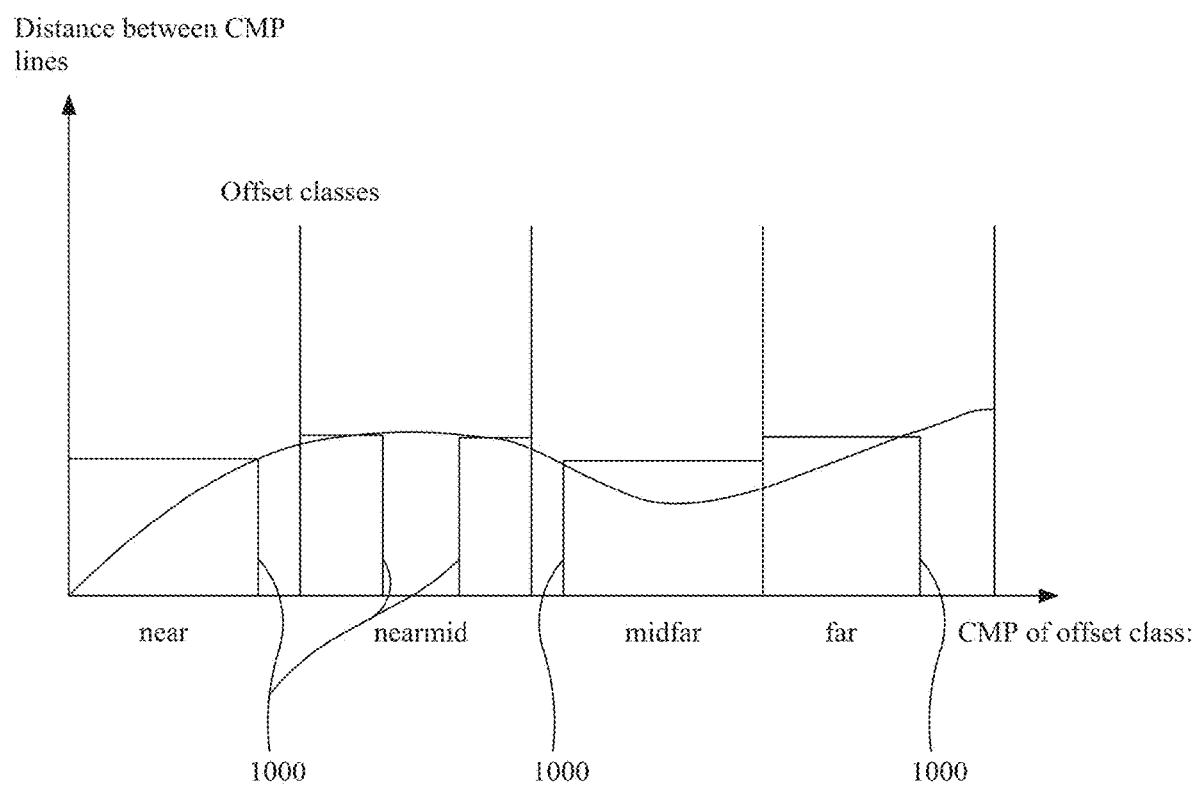
FIG. 10 is a graph showing a distribution of distances between CMP lines classed by offset and indicative of CMPs at the limit of the fold.

By then applying, from the survey specifications, the fold specification minimal distance for each offset class as indicated by the shaded blocks in the graph of FIG. 10, a CMP at the fold limit can be selected from each offset class (i.e., where the CMP distance intersects with the fold minimal distance from the specifications in each offset class as indicated by lines 1000). One of these selected CMPs will then be chosen to be the steering point, as shown in FIG. 11.

Basically, according to an embodiment, the CMP that is the most constraining at a given time is selected as the steering point, i.e., the CMP point of the offset class which corresponds to the largest crossline distance. According to one embodiment, illustrated in FIG. 11, this means the CMP from the group of CMPs (one for each offset class) which has the maximal value of the difference between that CMP's distance to the adjacent line's outer streamer CMP and the distance authorized (in the specification). Thus, in the example of FIG. 11, one of either CMP number i1, i2, i3 and i4 are selected as the steering point or point of interest based upon this evaluation.

The embodiment described above uses offset and azimuth as geophysical inputs to the process of selecting a steering point. There are other options, e.g., using trajectories of the CMPs. Some embodiments describing this alternative will now be discussed.

Initially, as an alternative to equation (1), the computation of coverage boundaries could instead be performed by using equation (3):

$$C = f(x, y, i, T_i) \quad (3)$$

where:
C is the number of hits,
x, y are geographical coordinates,
i is the i-th receiver of the seismic spread, and
$T_i$ is the trajectory of the i-th receiver passing by the geographical location x,y.

Figure 12:
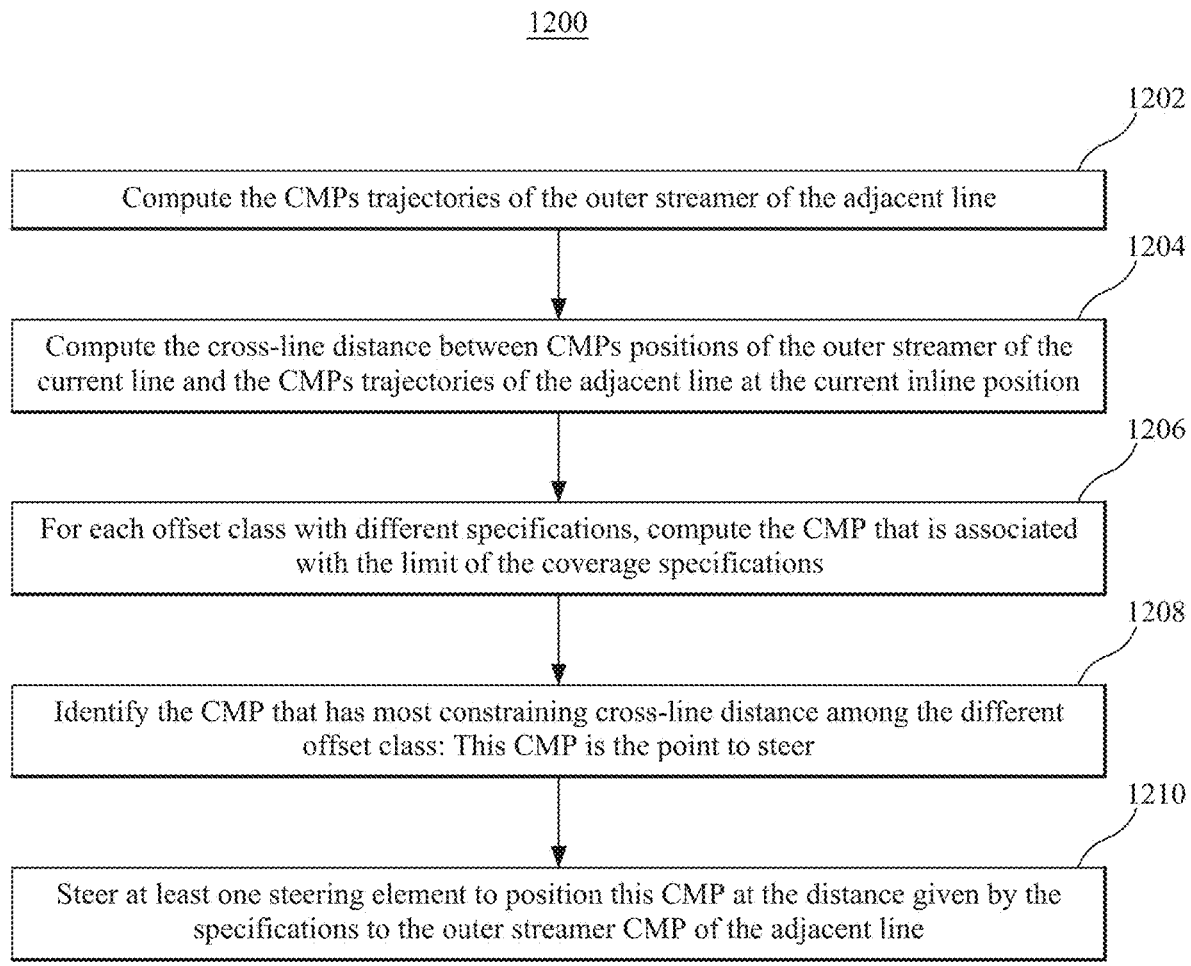
FIG. 12 is a flow chart illustrating a method according to an embodiment.
Figure 13:
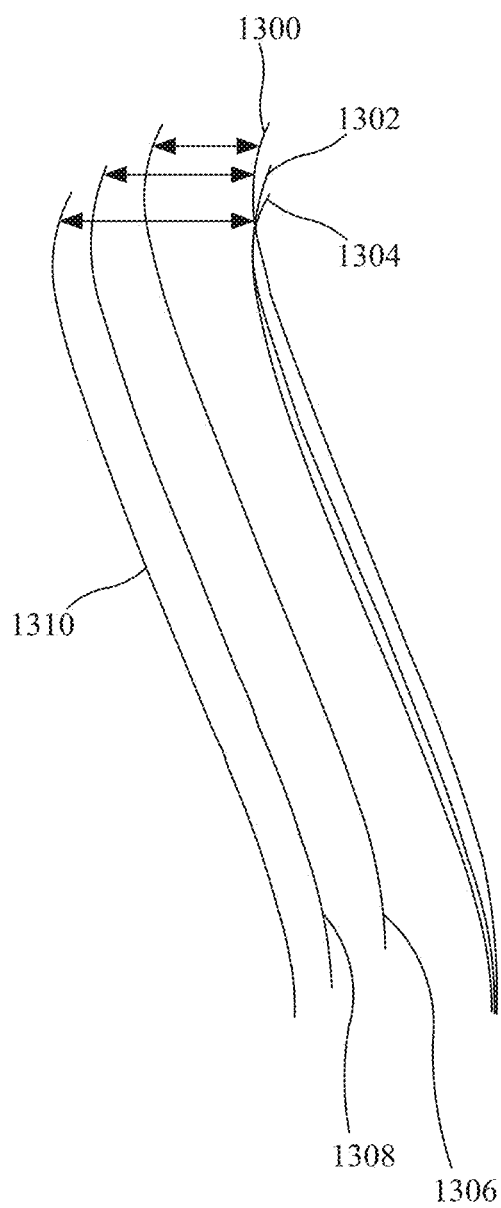
FIG. 13 depicts trajectories used to determine coverage boundaries according to an embodiment.

A method embodiment 1200 which uses a trajectory-based function such as equation (3) to determine coverage boundaries as part of a process to determine a suitable steering point is shown in the flow chart of FIG. 12. Initially, the CMPs' trajectories for the outer streamer of the line adjacent to the current line in the acquisition are computed at step 1202, e.g., by using the available real time navigation data with the CMP points being the midpoint between source and receiver positions. For example, three such trajectories 1300, 1302 and 1304 associated with the adjacent line are shown in FIG. 13. Next, at step 1204, the cross-line distances between the CMPs' positions for the outer streamer of the current line and the corresponding CMPs positions on the trajectories of the adjacent line at the current line are computed. This is seen graphically in FIG. 13 where the computed distances for step 1204 are represented by the horizontal arrows between the CMPs associated with the rajectories 1300, 1302 and 1304, and the corresponding CMPs on the outer streamer of the current line 1306, 1308 and 1310, respectively.

For each offset class with different survey specifications, the CMP that is associated with the limit of the coverage specifications is determined at step 1206, i.e., in a manner similar to that discussed above with respect to FIG. 10. For example, the cross-line distances associated with the CMPs can be sorted, and the CMP for each offset class which corresponds to the specification limit can be selected. The CMP that has the most constraining cross-line distance is identified in step 1208 as the steering point, i.e., in a manner similar to that described above with respect to step 804 and FIG. 11. Then, that steering point is used to steer at least one steering element (i.e., an actuator associated with the vessel, a bird and/or a source) to position this steering point (the selected CMP) at the distance given by the survey specifications to the outer streamer CMP of the adjacent line at step 1210.

Other embodiments can be considered which also use CMP trajectories to provide geophysical inputs as part of the determination of coverage boundaries for identifying a desired steering point. Two such embodiments are provided as flow charts in FIGS. 14 and 16. Starting with the embodiment of FIG. 14, therein a steering method 1400 is depicted which generates a steering command using a distribution of the CMPs relative to their respective computed preplot. At step 1402, the CMPs trajectories of the outer streamer of the adjacent line are computed, in a manner similar to that described above with respect to step 1402. At step 1404, the CMP trajectories are shifted based on the coverage criteria in the specifications, e.g., based on the flex bin size for each offset class. This step results in each shifted CMP trajectory now being a preplot of a given CMP of the outer streamer of the current line corresponding to an offset. Next, at step 1406, for each CMP of the outer streamer of the current line, the cross-line distance between that CMP and its preplot is computed. Then, for each offset class having different fold specifications, the percentage of CMPs of the outer streamer located on each side of its preplot is calculated. For example, as shown in FIG. 15, for each of the trajectories 1502, 1504 and 1506 a percentage of CMPs on each side of that trajectory would be determined, e.g., X % on one side of trajectory 1502 and Y % on the other side of trajectory 1502.

These computed percentages are then compared to the survey specifications at step 1410 to determine a steering direction. If one of the percentages of CMPs of each class located on the side where the line is targeting to progress in coverage is below the required percentage by specification, then the vessel will be steered in that direction. Otherwise, the vessel shall be steered in the other direction. A "no change in steering direction" (idle position) can be defined when the percentage is close enough to the value provided in the specifications.

Figure 14:
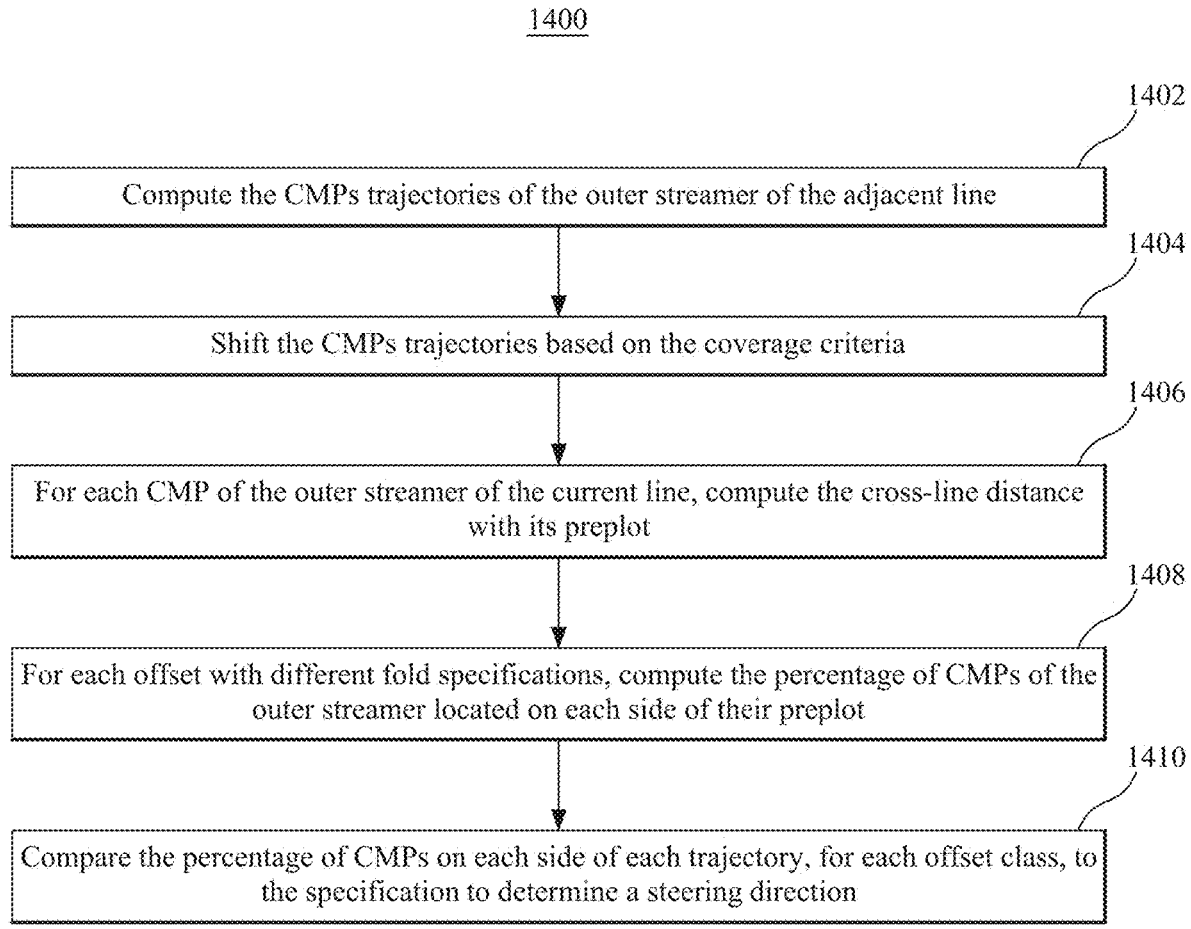
FIG. 14 is a flow chart illustrating a method according to an embodiment.
Figure 15:
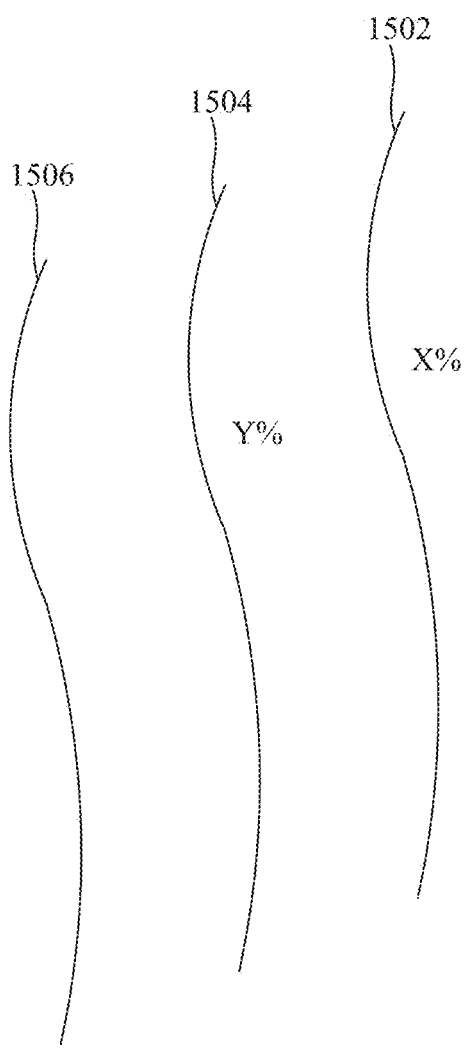
FIG. 15 graphically depicts a comparison of a percentage of CMPs to either side of a trajectory.
Figure 16:
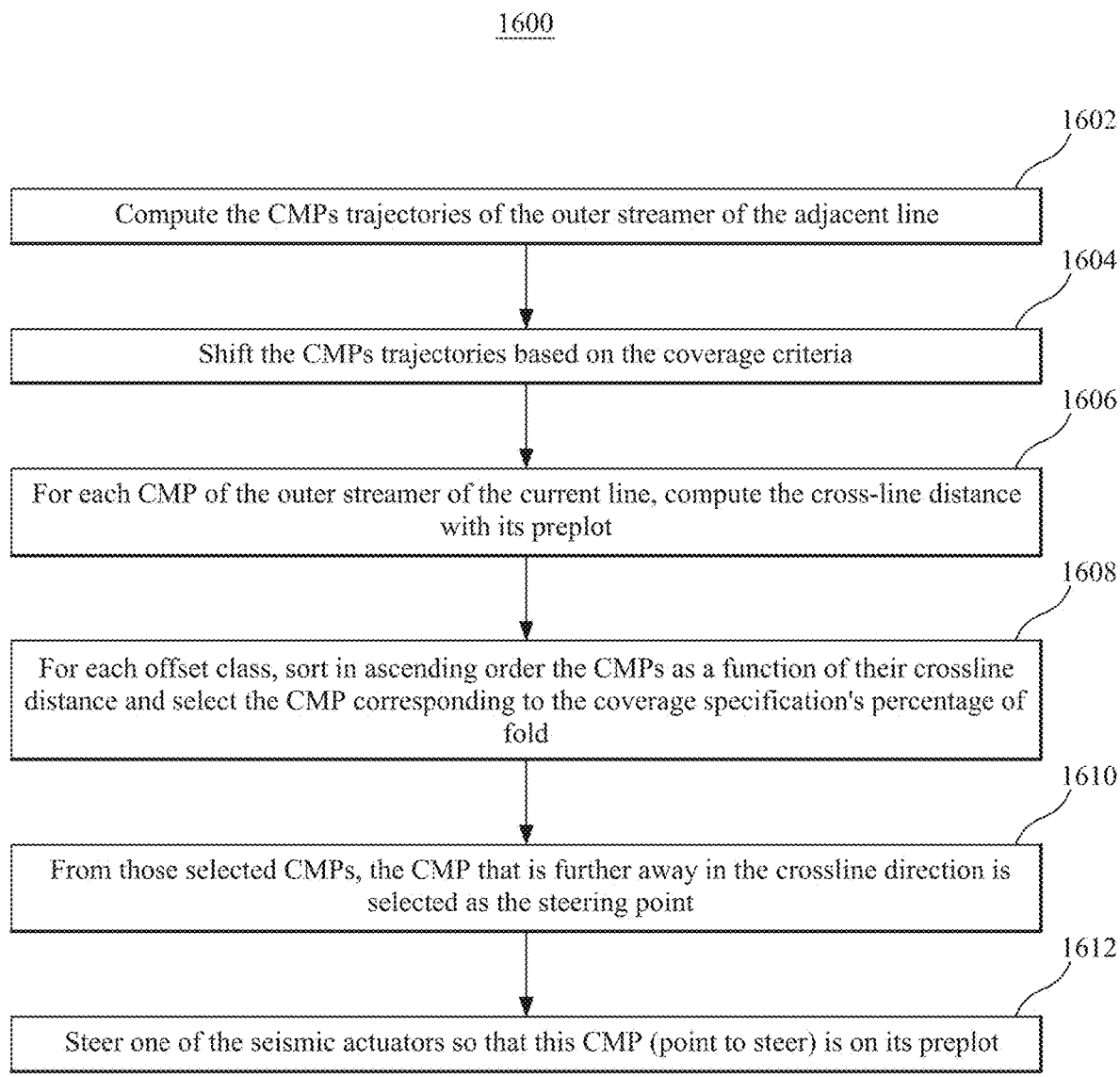
FIG. 16 is a flow chart illustrating a method according to an embodiment.

FIG. 16 is a flowchart which illustrates another steering method which is similar to the embodiment of FIG. 14, except that it provides for a quantitative command using a point to steer which is selected by analyzing the distribution of the CMPs relative to their respective computed preplots, rather than a qualitative direction to steer as in the embodiment of FIG. 14. Steps 1602-1606 are the same as steps 1402-1406. At step 1608, for each offset class, sort in ascending order the CMPs as a function of their crossline distance and. select the one corresponding to the coverage specification percentage of fold. From those selected CMPs, at step 1610, the CMP that is further away in the crossline direction is selected as the steering point. Then steering is performed using this steering point at step 1612.

Figure 17:
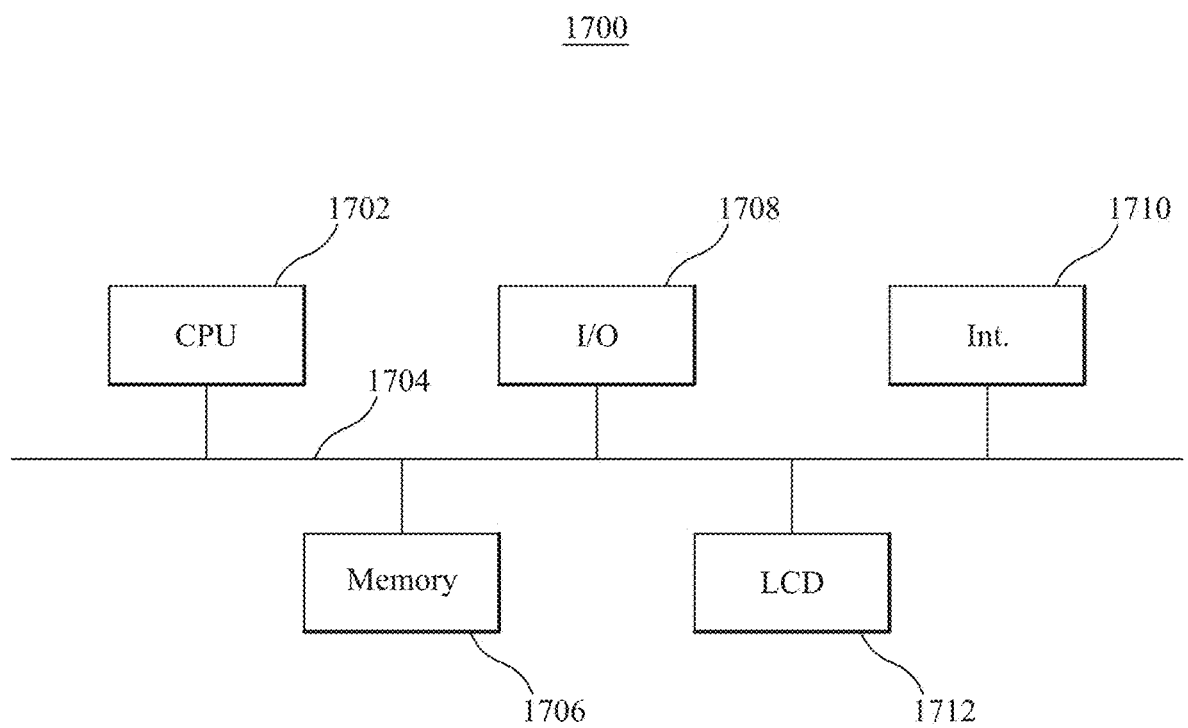
FIG. 17 illustrates a system according to an embodiment.

The methods and algorithms discussed above may be implemented in a computing device 1700 as illustrated in FIG. 17. The computing device 1700 may be a processor, a computer, a server, etc. The computing device 1700 may include a processor 1702 connected through a bus 1704 to a storage device 1706. The storage device 1706 may be any type of memory and may store necessary commands and instructions associated with positioning the sources and the streamer spreads as discussed above. Also connected to the bus 1704 is an input/output interface 1708 through which the operator may interact with the sources, for example, for adjusting a position of the sources based on the identified steering point. A communication interface 1710 is also connected to the bus 1704 and is configured to transfer information between the processor 1702 and an outside network, Internet, operator's internal network, etc. The communication interface 1710 may be wired or wireless. Optionally, computing device 1700 may include a screen 1712 for displaying various results generated by the algorithms discussed above. For example, the steering point and/or adjusted tracks may be displayed, after being calculated with the novel algorithms described above, on the screen 1712.

Figure 1:
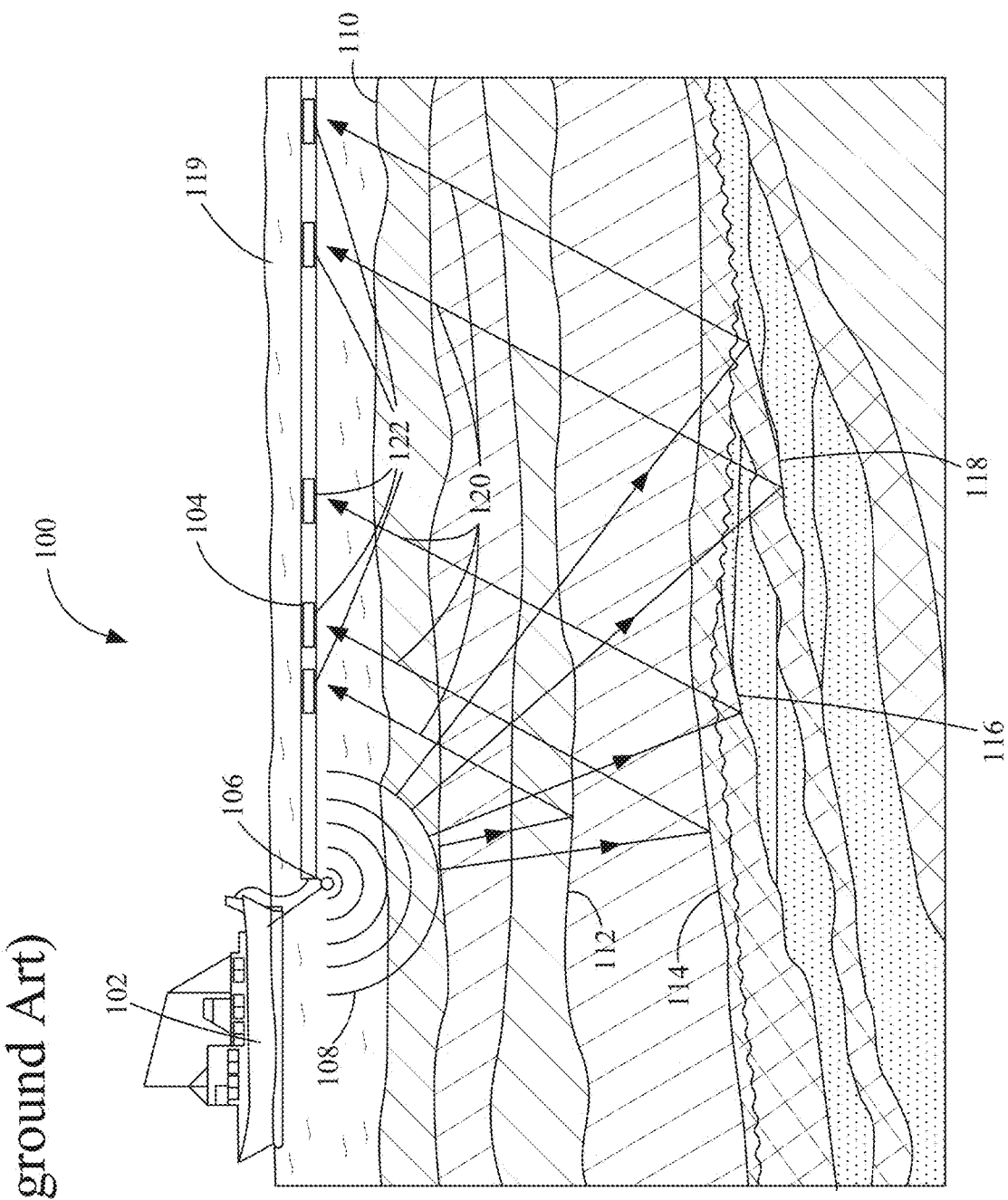
FIG. 1 is a schematic illustration of a traditional marine seismic data acquisition system.
Figure 2:
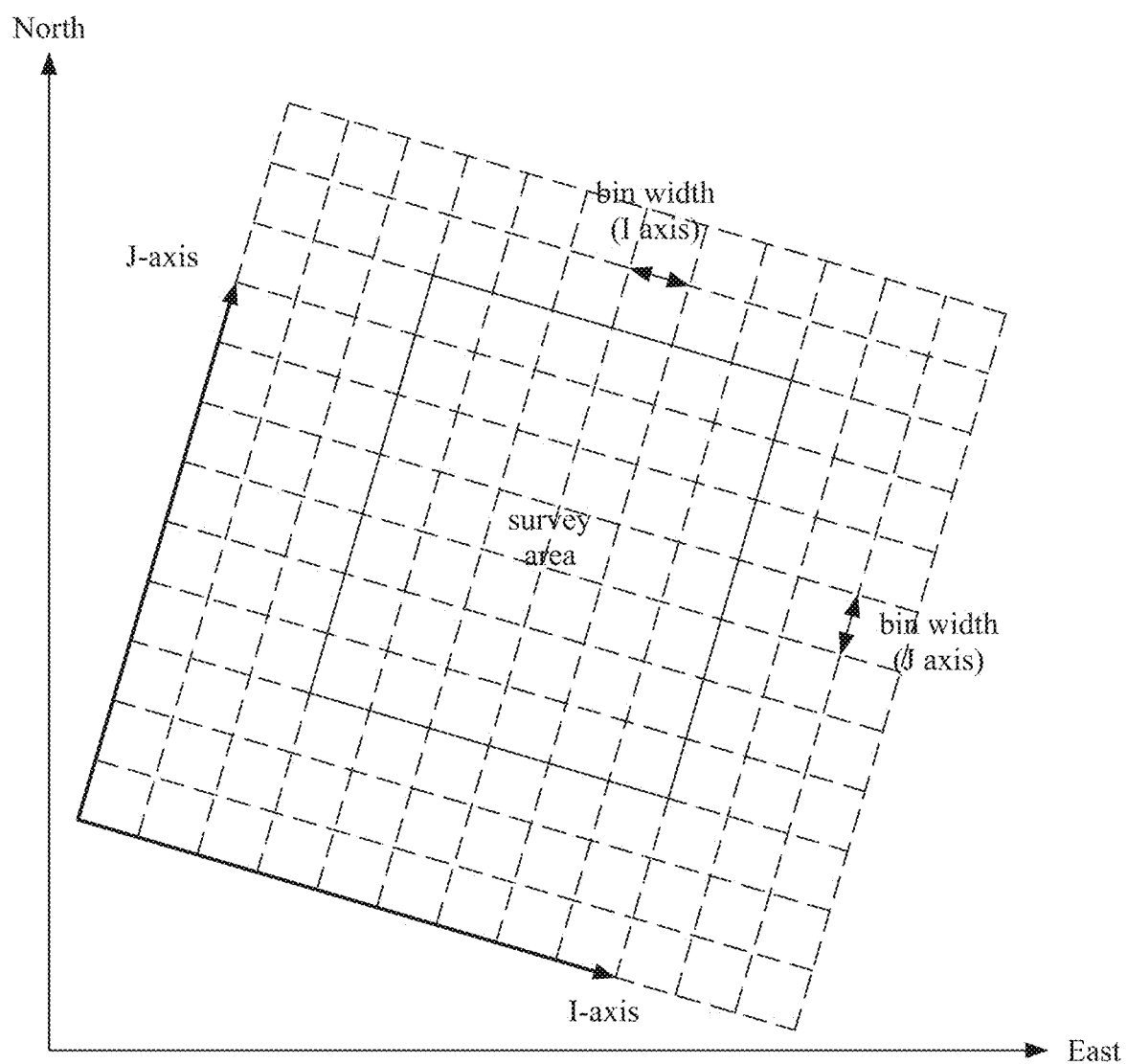
FIG. 2 is an example of a binning grid.
Figure 3:
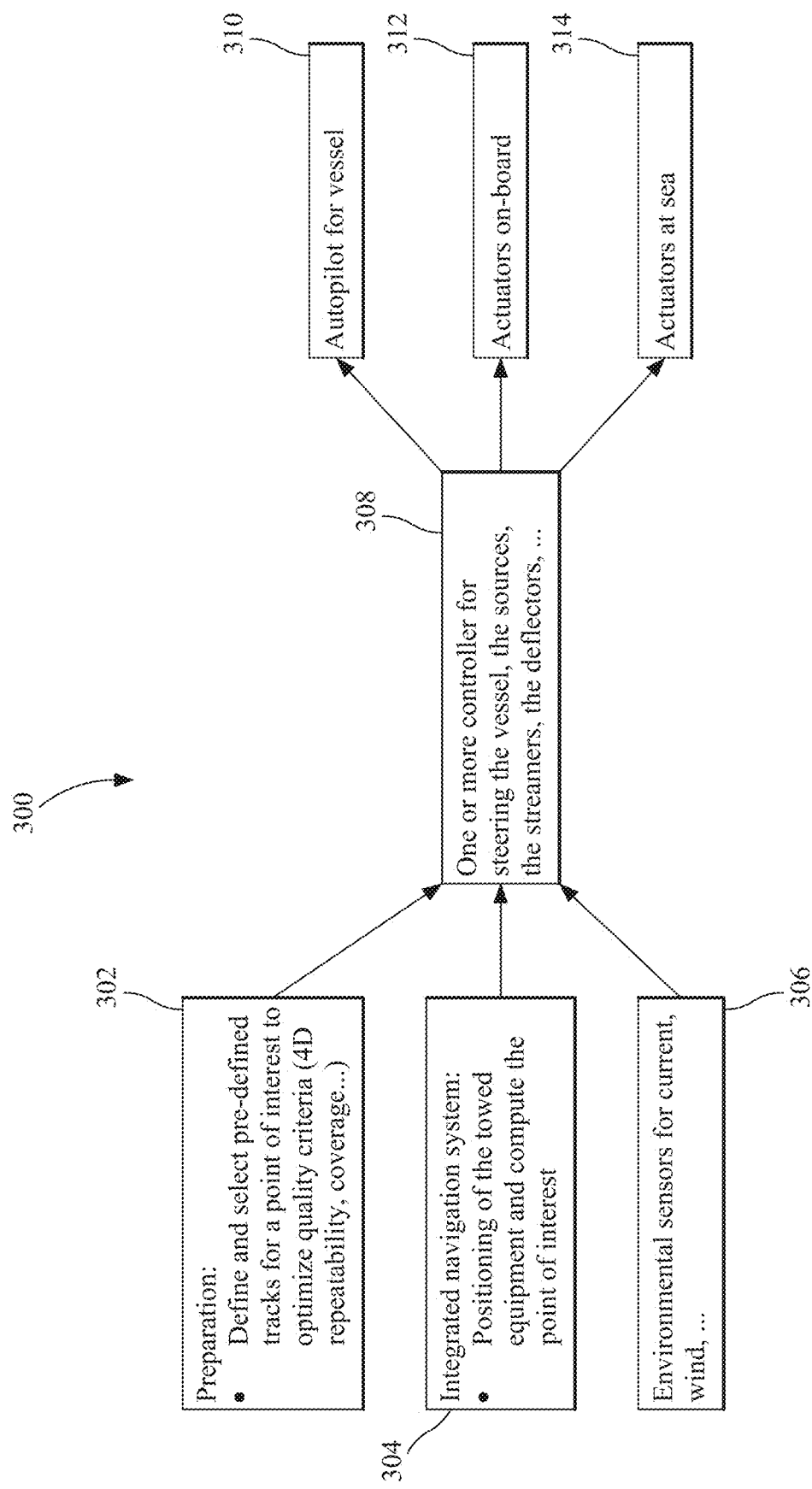
FIG. 3 is an example of a vessel steering system.

Once a steering point has been determined, using any of the foregoing embodiments, a navigation system such as that described above with respect to FIG. 3, can be used to generate one or more steering commands to one or more steering elements. This can be done, for example, as described in the above-described U.S. Patent Publication WO2015071491 to Tonchia, H. and Moulinier, T., entitled "Device and Method for Steering Seismic Vessel", or using any other suitable technique and system.

The above-disclosed embodiments provide a system and a method for steering an element in a seismic acquisition system using both geographic and geophysical information. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for configuring a marine seismic acquisition system, the method comprising:
    computing coverage boundaries for a current line in a seismic survey and for an already acquired adjacent line in the seismic survey;
    computing cross-line distances between the coverage boundary for the current line and the coverage boundary for the adjacent line based on a set of specifications for the seismic survey;
    determining a steering point associated with towed seismic equipment based on the computed cross-line distances; and
    generating at least one steering command for a steering element in the marine seismic acquisition system based on the determined steering point,
    wherein the method further comprises:
    computing a coverage at a common midpoint (CMP) of each offset class for the seismic survey;
    determining a cross-line distance for each CMP offset class needed to meet coverage criteria for the seismic survey;
    using the determined cross-line distances, select a CMP at a fold limit associated with the seismic survey from each offset class; and
    selecting, as the steering point, the CMP associated with one of the offset classes which has the largest cross-line distance.

2. The method of claim 1, wherein the coverage boundaries are computed using both geographic and geophysical information.

3. The method of claim 2, wherein the geophysical information includes at least one of offset and azimuth.

4. The method of claim 1, wherein the largest cross-line distance is determined by:
    determining which of the CMPs selected for each offset class has a maximum difference between its cross-line distance and a distance authorized by the set of specifications for the seismic survey.

5. The method of claim 1, further comprising:
    actuating the steering element to steer at least one of a vessel, a source or a receiver in the marine seismic acquisition system based on the steering command.

6. A system for collecting seismic data comprising:
    at least one vessel that tows seismic equipment capable of generating and/or receiving seismic waves; and
    a processor, associated with a navigation system, which is configured to:
        compute coverage boundaries for a current line in a seismic survey and for an already acquired adjacent line in the seismic survey;
        compute cross-line distances between the coverage boundary for the current line and the coverage boundary for the adjacent line based on a set of specifications for the seismic survey;

determine a steering point associated with towed seismic equipment based on the computed cross-line distances; and generate at least one steering command for a steering element in the system based on the determined steering point, wherein the processor is further configured to:

compute a coverage at a common midpoint (CMP) of each offset class for the seismic survey;

determine a cross-line distance for each CMP offset class needed to meet coverage criteria for the seismic survey;

use the determined cross-line distances to select a CMP at a fold limit associated with the seismic survey from each offset class; and select, as the steering point, the CMP associated with one of the offset classes which has the largest cross-line distance.

7. The system of claim 6, wherein the coverage boundaries are computed using both geographic and geophysical information.

8. The system of claim 7, wherein the geophysical information includes at least one of offset and azimuth.

9. The system of claim 6, wherein the largest cross-line distance is determined by:

determining which of the CMPs selected for each offset class has a maximum difference between its cross-line distance and a distance authorized by the set of specifications for the seismic survey.

10. The system of claim 6, further comprising:

an actuator configured to actuate the steering element to steer at least one of a vessel, a source or a receiver in the marine seismic acquisition system based on the steering command.

* * * * *